(12) United States Patent
Bhogal et al.

(10) Patent No.: US 8,688,489 B2
(45) Date of Patent: Apr. 1, 2014

(54) AUTONOMOUSLY RESCHEDULING APPOINTMENTS

(75) Inventors: Kulvir Singh Bhogal, Pflugerville, TX (US); Robert Ross Peterson, Austin, TX (US); Lisa Anne Seacat, San Francisco, CA (US); Mark William Talbot, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 833 days.

(21) Appl. No.: 12/236,077

(22) Filed: Sep. 23, 2008

(65) Prior Publication Data
US 2010/0076802 A1     Mar. 25, 2010

(51) Int. Cl.
*G06Q 40/00*     (2012.01)

(52) U.S. Cl.
USPC ..................................... 705/7.11; 705/7.42

(58) Field of Classification Search
USPC .......................................... 705/8, 7.11–7.42
See application file for complete search history.

(56) References Cited

U.S. PATENT DOCUMENTS

| | | | | |
|---|---|---|---|---|
| 5,050,077 A * | 9/1991 | Vincent | | 705/7.19 |
| 5,111,391 A * | 5/1992 | Fields et al. | | 705/7.14 |
| 5,270,920 A * | 12/1993 | Pearse et al. | | 705/7.16 |
| 5,774,867 A * | 6/1998 | Fitzpatrick et al. | | 705/7.19 |
| 5,911,134 A * | 6/1999 | Castonguay et al. | | 705/7.12 |
| 6,856,962 B2 * | 2/2005 | Yonemitsu | | 705/7.13 |
| 7,155,399 B2 * | 12/2006 | Andre et al. | | 705/7.14 |
| 7,519,924 B2 * | 4/2009 | Bocking et al. | | 706/20 |
| 7,672,746 B1 * | 3/2010 | Hamilton et al. | | 700/100 |
| 8,086,478 B2 * | 12/2011 | Chen et al. | | 705/7.19 |
| 2004/0267591 A1 * | 12/2004 | Hedlund et al. | | 705/9 |
| 2007/0094661 A1 * | 4/2007 | Baird et al. | | 718/102 |
| 2007/0198316 A1 * | 8/2007 | Boland et al. | | 705/8 |
| 2007/0239509 A1 * | 10/2007 | Kaminsky et al. | | 705/9 |
| 2008/0091504 A1 * | 4/2008 | Lyle et al. | | 705/9 |
| 2008/0147472 A1 * | 6/2008 | Hitz | | 705/9 |
| 2010/0076804 A1 * | 3/2010 | Jones | | 705/8 |

OTHER PUBLICATIONS

Prasad et al., Enforcing Interdependencies and Executing Transactions Atomically Over Autonomous Mobile Data Stores Using SyD Link Technology, Proceedings of the 23rd International Conference on Distributed Computing Systems Workshops (ICDCSW'03), 2003, IEEE.

* cited by examiner

*Primary Examiner* — Thomas Dixon
*Assistant Examiner* — Benjamin S Fields
(74) *Attorney, Agent, or Firm* — Yudell Isidore Ng Russell PLLC

(57) ABSTRACT

A method, system, and computer program product for autonomously rescheduling a future meeting in response to receiving a meeting cancellation notice of a previously scheduled meeting. A meeting rescheduling logic (MRL) of a server receives a cancellation of a scheduled meeting of an identified contact. The MRL may select a highest priority meeting from a plurality of meetings that has been flagged with an auto-move-up status. The MRL determines if all attendees of the selected meeting are available to attend the meeting at the open time slot of the identified contact's calendar. Upon determining that all attendees of the selected meeting are available at the open time slot, the MRL reschedules the selected meeting at the open time slot, and notifies all attendees. Additionally, the MRL may cancel a lower priority meeting of the attendees to accommodate moving a higher priority meeting into the open time slot.

12 Claims, 3 Drawing Sheets

AUTONOMOUSLY RESCHEDULING APPOINTMENTS

BACKGROUND OF THE INVENTION

1. Technical Field

The present invention relates in general to meeting scheduling systems. Still more particularly, the present invention relates to autonomously rescheduling a future meeting in response to the cancellation of a previously scheduled meeting of an identified contact's calendar.

2. Description of the Related Art

Calendar databases have become ubiquitous in managing schedules of multiple employees in a business setting. Currently, calendar databases only manage and provide organization for meetings in established time. In many situations, a cancellation of a scheduled meeting by one of the invitees may open up a suitable time slot for an important future meeting to be rescheduled at an earlier date/time. Attendees of the future meeting may be unaware of this newly opened time slot.

SUMMARY OF THE INVENTION

A method, system, and computer program product for autonomously rescheduling a future meeting in response to receiving a meeting cancellation notice of a previously scheduled meeting. A meeting rescheduling logic (MRL) of a server receives a cancellation of a scheduled meeting of an identified contact. MRL may select a highest priority meeting from a plurality of meetings that has been flagged with an auto-move-up status. MRL determines if all attendees of the selected meeting are available to attend the meeting at the open time slot of the identified contact's calendar. Upon determining that all attendees of the selected meeting are available at the open time slot, MRL reschedules the selected meeting at the vacated time slot, and notifies all attendees. Additionally, MRL may cancel a lower priority meeting of the attendees to accommodate moving a higher priority meeting into the open time slot.

The above features of the present invention will become apparent in the following detailed written description.

BRIEF DESCRIPTION OF THE DRAWINGS

The novel features believed characteristic of the invention are set forth in the appended claims. The invention itself, however, will best be understood by reference to the following detailed descriptions of an illustrative embodiment when read in conjunction with the accompanying drawings, wherein:

DETAILED DESCRIPTION OF THE PREFERRED EMBODIMENT

The illustrative embodiments provide a method, system, and computer program product for utilizing a calendar scheduler on a server to autonomously reschedule future meetings.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Figure 1:
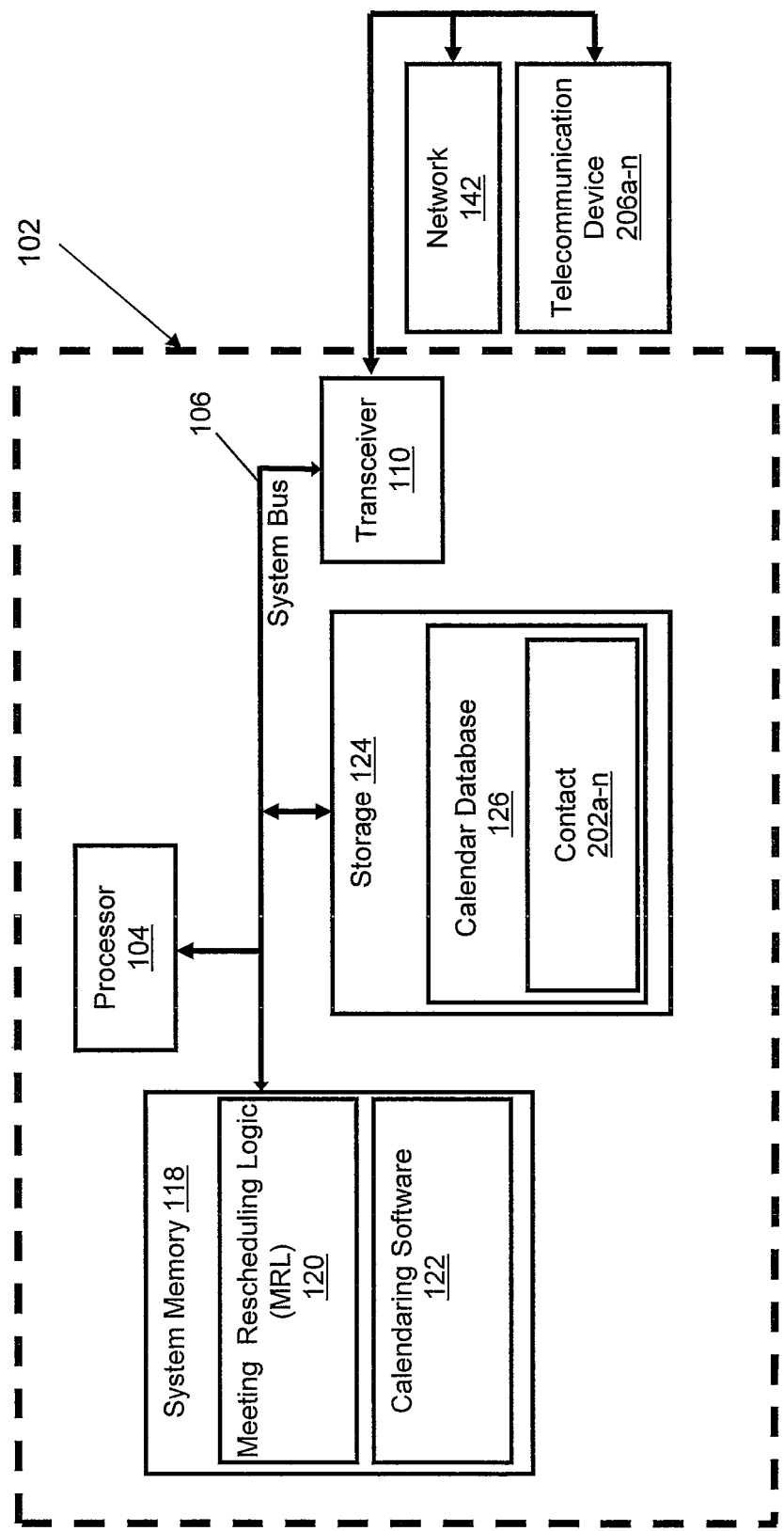
FIG. 1 is a block diagram of a server in which the present invention may be implemented.

With reference now to FIG. 1, there is depicted a block diagram of an exemplary server 102 in which the present invention may be implemented. Server 102 includes a processor 104 that is coupled to a system bus 106. A transceiver 110, connected to system bus 106, enables server 102 to communicate with telecommunication devices 206*a-n* and network 142 utilizing wired or wireless based technology.

Server 102 also comprises system memory 118, which is connected to system bus 106. System memory 118 of Server 102 includes meeting rescheduling logic (MRL) 120. MRL 120 includes logic for implementing the processes described in FIGS. 2-3. A calendaring software 122 for maintaining calendar entries may also be stored in system memory 118.

Server 102 also comprises storage 124, which is connected to system bus 106. As shown, storage 124 contains a calendar database 126 for scheduling meetings with priority data. Calendar database 126 contains listings of contacts 202*a-n*, as further described in FIGS. 2-3. Contacts 202*a-n* may also be stored on a telecommunication device 206*a-n* accessible by server 102. In one embodiment, calendar database 126 may be accessed remotely by telecommunication devices 206*a-n* or network 142. Additionally, As illustrated and described herein, server 102 may be any networked computer system having required hardware components and programmed with MRL 120, which executes on the processor to provide the functionality of the invention. The hardware elements depicted in server 102 are not intended to be exhaustive, but rather are representative to highlight essential components required by and/or utilized to implement the present invention. For instance, server 102 may include alternate memory storage devices such as magnetic cassettes, Digital Versatile Disks (DVDs), Bernoulli cartridges, and the like. These and other variations are intended to be within the spirit and scope of the present invention.

Figure 2:
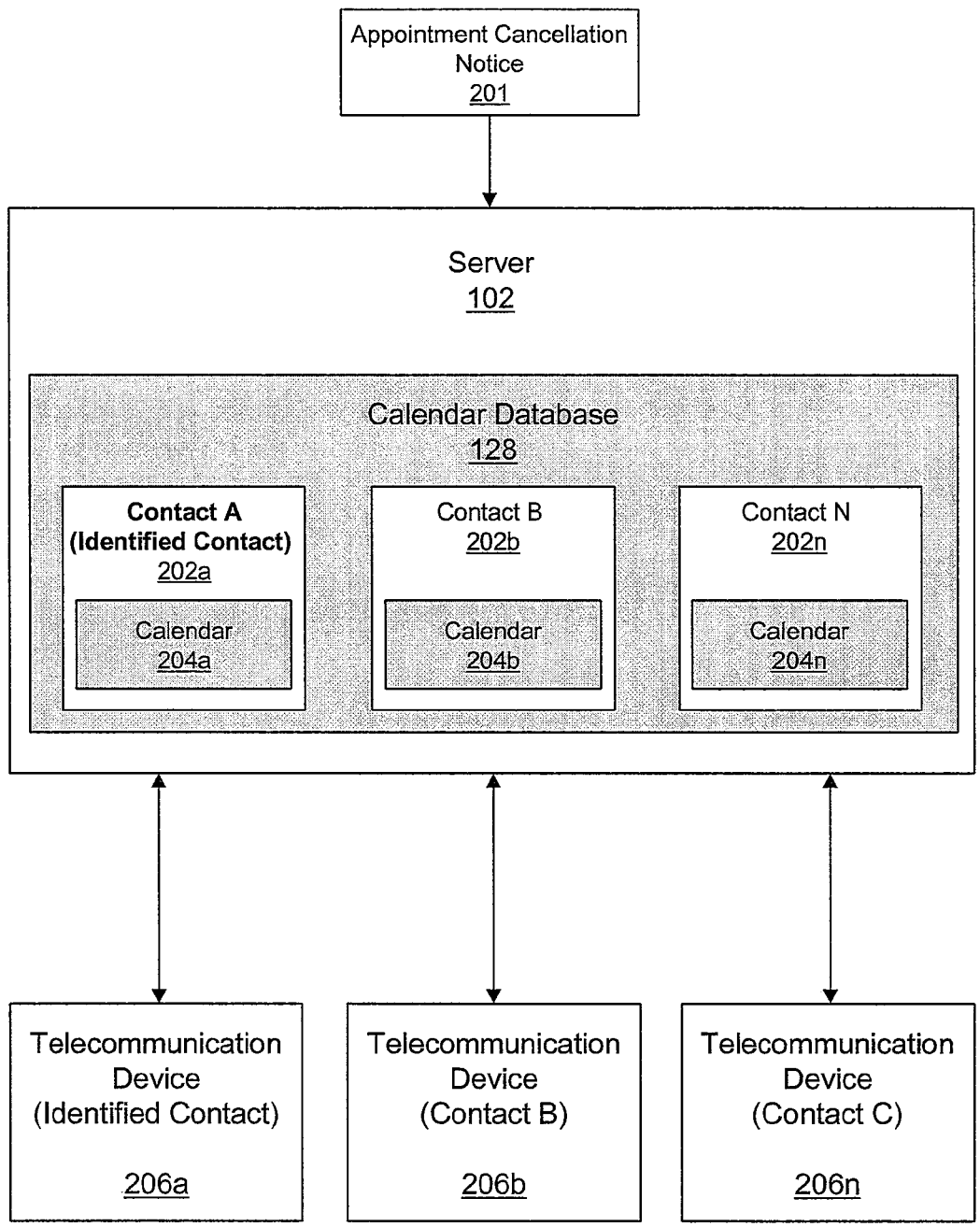
FIG. 2. is a block diagram of an exemplary system for utilizing a server to autonomously reschedule future meetings.

With reference now to FIG. 2, a block diagram of an exemplary system for utilizing a server to autonomously reschedule future meetings is illustrated. Server 102 contains a calendar database 128. The calendar database contains listings for one or more contacts 202*a-n* assigned to users previously identified to server 102. Each contact 202*a-n* contains a calendar 204*a-n* corresponding to that contact 202*a-n*. A contact 202*a-n* may be designated as an identified contact. An identified contact is a person that is specially identified in a contact listing or calendar 204*a-n* of server 102. In the main embodiment, server 102 reschedules appointments of other contacts 202*a-n* with reference to the identified contact. In an exemplary embodiment, an identified contact could be an employee of a company. It is important to note that the identified contact is not necessarily a person of an elevated stature. Rather the identified contact is only a specifically identified individual who may be particularly busy, for example. A calendar 204a-n contains information of one or more meetings (not pictured) for which the corresponding contact 202a-n is scheduled to attend. A meeting is a schedule listing of a specific appointment identifying the date and time of the appointment. A meeting may also identify other scheduled attendees of that meeting, and the type of meeting (e.g., face-to-face meeting, teleconference). In an alternative embodiment, a meeting may identify one of the attendees of a meeting as being the identified contact. Individual meetings of a calendar 204a-n may be flagged with an auto move-up status, and may also be assigned a priority level. A meeting with an auto move-up status flag indicates that specific meeting should be dynamically rescheduled for an earlier date/time, if an earlier time slot becomes available. Server 102 may also be connected to telecommunication devices 206a-n corresponding to contacts 202a-n. Contacts 202a-n may communicate and interact with calendar 204a-n by utilizing telecommunication devices 206a-n.

In response to a scheduled meeting of an identified contact being cancelled, server 102 receives a meeting cancellation notice 201. Meeting cancellation notice 201 contains the date and time of the cancelled meeting, and may additionally identify the identified contact and attendees of the cancelled meeting. In response to receiving meeting cancellation notice 201, MRL 120 may review a plurality of scheduled meetings of the calendar 204 of the identified contact of the cancelled meeting. In response, to reviewing the scheduled meetings of the identified contact's calendar 204, MRL 120 identifies one or more meetings that are flagged with an auto move-up status. MRL 120 then selects the highest priority meeting from the identified meetings that is flagged with an auto move-up status. MRL 120 may then identify the contacts 202a-n listed as attendees of the selected meeting. After identifying the listed contacts 202a-n, MRL 120 reads the calendars 204a-n of the identified contacts 202a-n and determines if the contacts 202a-n are available to attend a rescheduling of the selected meeting at the scheduled time of the cancelled meeting.

Upon determining that all listed attendees are available to attend a rescheduling of the selected meeting at the scheduled time of the cancelled meeting, MRL 120 dynamically reschedules the selected meeting. When MRL 120 determines that an attendee is unavailable to attend the rescheduling because of a prior commitment, MRL 120 determines the priority level of the prior commitment. When the priority level of the prior commitment is lower than the priority level of the selected meeting, MRL 120 autonomously cancels the prior commitment, and reschedules the selected meeting at the scheduled time of the cancelled meeting. When server 102 is unable to reschedule the selected meeting because of scheduling conflicts with attendees of the meeting, MRL 120 selects a next highest priority meeting flagged with an auto move-up status and repeats the above processes.

Server 102 may also transmit notification messages to telecommunication devices 206a-n assigned to each listed attendee of a meeting to inform the attendees of any schedule changes. The notification message may be in the form of a text-based message (e.g., page, Short Message Service (SMS) Message, email) or an audio message (e.g., voice recording, pre-recorded phone message). The notification message informs the attendee of the schedule change and contains updated time information of the selected meeting. Server 102 may also transmit a separate notification message to the identified contact of the selected meeting, wherein the notification message contains notice of the cancelled meeting and notice of the updated time of the selected meeting.

Figure 3:
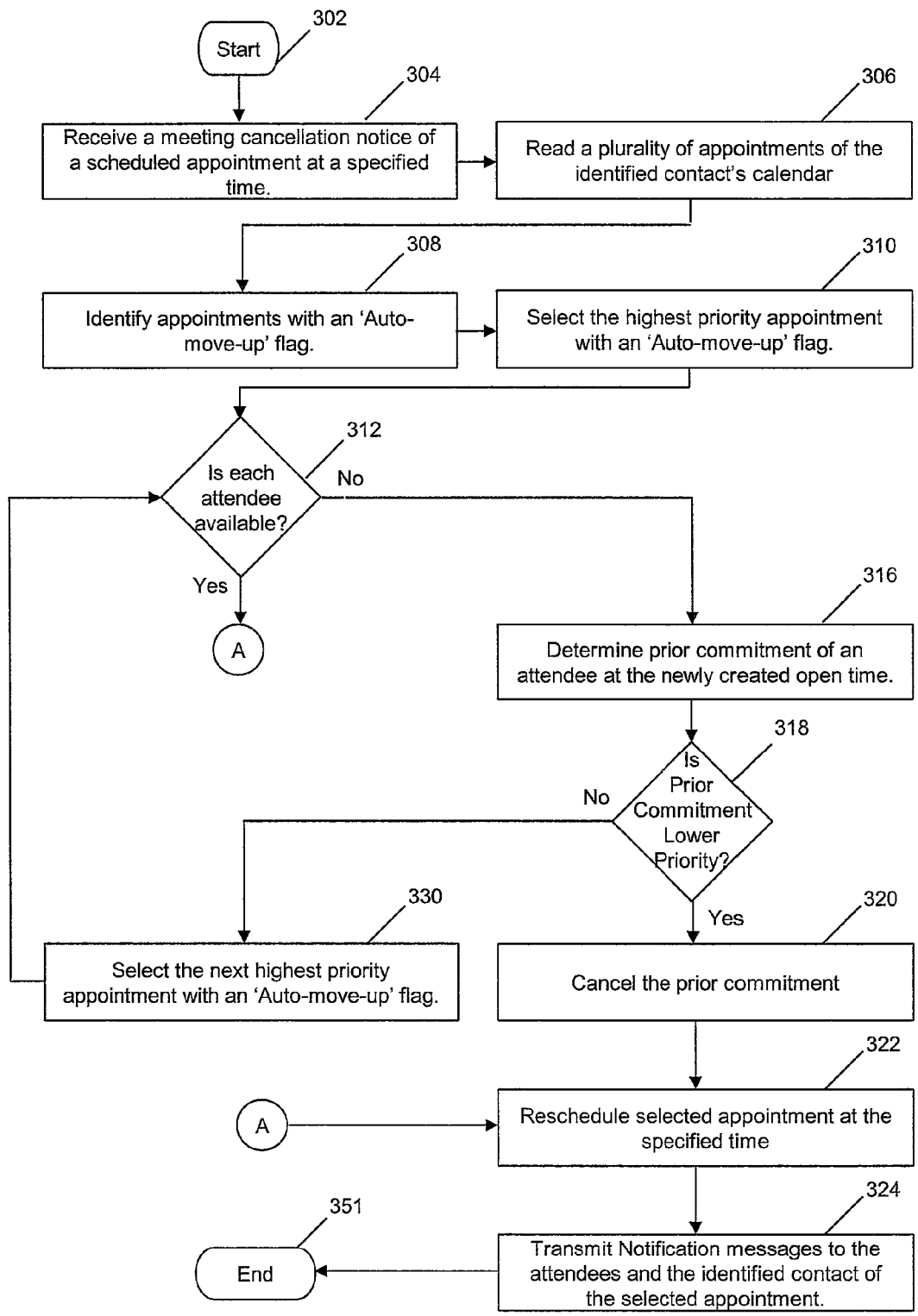
FIG. 3. is a high-level logical flowchart of an exemplary method for utilizing a server to autonomously reschedule future meetings.

With reference now to FIG. 3, a high-level logical flowchart of an exemplary method for using a server to autonomously reschedule future meetings is presented. After initiator block 302, the server receives a cancellation notice of a scheduled meeting of an identified contact (block 304).

The MRL views upcoming meetings listed on the calendar of the identified contact (block 306). Upon viewing the upcoming meetings listed on the calendar of the identified contact, the MRL identifies meetings of the identified contact's calendar flagged with an auto move-up status (block 308). The MRL selects the highest priority meeting of the meetings of the identified contact's calendar flagged with an auto move-up status (block 310). The server then determines if each attendee of the selected meeting is available to attend the selected meeting at the time of the cancelled meeting (block 312). In response to determining that each attendee being available at the time of the cancelled meeting, MRL reschedules the selected meeting for that time (block 322). The server may then transmit notification messages to each attendee and the identified contact of the selected meeting, informing the recipient of the schedule changes (block 324). The process then terminates at block 341.

In response determining (at block that one or more attendees are not being available to attend the selected meeting at the time of the cancelled meeting, MRL retrieves info of prior commitments of the attendees (block 316). The MRL then determines if each prior commitment has a lower priority than the priority level of the selected meeting (block 318). If one or more prior commitments has a higher priority level than the selected meeting, MRL selects a next highest priority meeting of the identified contact's calendar flagged with an auto move-up status (block 330). The process then loops in an iterative manner to block 312.

At block 318, when identified prior commitment has a lower priority than the selected meeting, the server cancels the prior commitments (block 320) and reschedules the selected meeting at the time of the cancelled meeting (block 322), when all attendees are available. The server may then transmit notification messages to each attendee and the identified contact of the selected meeting, informing the recipient of the schedule changes (block 324). The process then terminates at block 351.

In the flow charts above, one or more of the methods are embodied in microcode such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

Although aspects of the present invention have been described with respect to a computer processor and program application/logic, it should be understood that at least some aspects of the present invention may alternatively be implemented as a program product for use with a data storage system or computer system. Programs defining functions of the present invention can be delivered to a data storage system or computer system via a variety of signal-bearing media, which include, without limitation, non-writable storage media (e.g. CD-ROM), writable storage media (e.g. a floppy diskette, hard disk drive, read/write CD-ROM, optical media), and communication media, such as computer and telephone networks including Ethernet. It should be understood, therefore, that such signal-bearing media, when carrying or encoding computer readable instructions that direct method functions of the present invention, represent alternative embodiments of the present invention. Further, it is understood that the present invention may be implemented by a system having means in the form of hardware, software, or a combination of software and hardware as described herein or their equivalent.

Having thus described the invention of the present application in detail and by reference to illustrative embodiments thereof, it will be apparent that modifications and variations are possible without departing from the scope of the invention defined in the appended claims. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A computer-implemented method for autonomously rescheduling meetings, the method comprising:
    receiving, by a computer, a meeting cancellation notice of a first meeting scheduled with an identified contact, wherein the meeting cancellation notice contains a specified time of the meeting;
    in response to receiving the meeting cancellation notice, reviewing a plurality of scheduled meetings of a calendar of the identified contact;
    the computer identifying, from the plurality of scheduled meetings within the calendar of the identified contact, one or more scheduled meetings that are flagged with an auto move-up status, wherein the auto move-up status indicates that a flagged meeting should be dynamically rescheduled for an earlier date/time, if an earlier time slot becomes available;
    selecting a second meeting that has a highest priority level of the one or more scheduled meetings that are flagged with an auto move-up status;
    identifying one or more listed attendees of the second meeting;
    determining if the listed attendees of the second meeting are available at the specified time;
    in response to determining that all of the listed attendees are available at the specified time, dynamically rescheduling the second meeting at the specified time;
    in response to determining that a listed attendee has a prior commitment at the specified time, determining a priority level of the prior commitment; and
    in response to determining that the priority level of the prior commitment is lower than a priority level of the second meeting:
        automatically cancelling the prior commitment; and
        rescheduling the second meeting at the specified time.

2. The method of claim 1, further comprising:
    transmitting a notification message to each of the one or more attendees of the second meeting, wherein the notification message informs the one or more attendees of a schedule change and contains an updated scheduled time for the second meeting.

3. The method of claim 1, further comprising:
    transmitting a notification message to the identified contact, wherein the notification message contains:
        the meeting cancellation notice of the first meeting; and
        the updated scheduled time for the second meeting.

4. The method of claim 2, wherein the notification is one of a text-based message or an audio message.

5. A server comprising:
    a processor;
    a system memory coupled to said processor;
    a program utility having code executing on the server that causes the server to:
        receive a meeting cancellation notice of a first meeting scheduled with an identified contact, wherein the meeting cancellation notice contains a specified time of the meeting;
        in response to receiving the meeting cancellation notice, reviews a plurality of scheduled meetings of a calendar of the identified contact;
        identify, from the plurality of scheduled meetings within the calendar of the identified contact, one or more scheduled meetings that are flagged with an auto move-up status, wherein the auto move up status indicates that a flagged meeting should be dynamically rescheduled for an earlier date/time, if an earlier time slot becomes available;
        select a second meeting that has a highest priority level of the one or more scheduled meetings that are flagged with an auto move-up status;
        identify one or more listed attendees of the second meeting;
        determine if the listed attendees of the second meeting are available at the specified time;
        in response to determining that all of the listed attendees are available at the specified time, dynamically reschedule the second meeting at the specified time;
        in response to determining that a listed attendee has a prior commitment at the specified time, determine a priority level of the prior commitment and
        in response to determining that the priority level of the prior commitment is lower than a priority level of the second meeting:
            automatically cancel the prior commitment and
            reschedule the second meeting at the specified time.

6. The system of claim 5, the program utility further comprising code that causes the server to:
    transmit a notification message to each of the one or more attendees of the second meeting, wherein the notification message informs the one or more attendees of a schedule change and contains an updated scheduled time for the second meeting.

7. The system of claim 5, the program utility further comprising code that causes the server to:
    transmit a notification message to the identified contact, wherein the notification message contains:
        the meeting cancellation notice of the first meeting; and
        the updated scheduled time for the second meeting.

8. The system of claim 6, wherein the notification is one of a text-based message or an audio message.

9. A computer program product comprising:
    a storage device; and
    program code on the storage device that when executed on a computer system causes the computer system to autonomously reschedule meetings by:

receiving a meeting cancellation notice of a first meeting scheduled with an identified contact, wherein the meeting cancellation notice contains a specified time of the meeting;

in response to receiving the meeting cancellation notice, reviewing a plurality of scheduled meetings of a calendar of the identified contact;

identifying, from the plurality of scheduled meetings within the calendar of the identified contact, one or more scheduled meetings that are flagged with an auto move-up status, wherein the auto move up status indicates that a flagged meeting should be dynamically rescheduled for an earlier date/time, if an earlier time slot becomes available;

selecting a second meeting that has a highest priority level of the one or more scheduled meetings that are flagged with an auto move-up status;

identifying one or more listed attendees of the second meeting;

determining if the listed attendees of the second meeting are available at the specified time;

in response to determining that all of the listed attendees are available at the specified time, dynamically rescheduling the second meeting at the specified time;

in response to determining that a listed attendee has a prior commitment at the specified time, determining a priority level of the prior commitment; and in response to determining that the priority level of the prior commitment is lower than a priority level of the second meeting:
automatically cancelling the prior commitment and rescheduling the second meeting at the specified time.

10. The computer program product of claim 9, the program code further comprising additional code for transmitting a notification message to each of the one or more attendees of the second meeting, wherein the notification message informs the one or more attendees of a schedule change and contains an updated scheduled time for the second meeting.

11. The computer program product of claim 9, the program code further comprising additional code for transmitting a notification message to the identified contact, wherein the notification message contains:
the meeting cancellation notice of the first meeting; and
the updated scheduled time for the second meeting.

12. The computer program product of claim 10, wherein the notification is one of a text-based message or an audio message.

\* \* \* \* \*